(12) United States Patent
Brewster et al.

(10) Patent No.: US 7,142,949 B2
(45) Date of Patent: Nov. 28, 2006

(54) AGGREGATION OF DISTRIBUTED GENERATION RESOURCES

(75) Inventors: David B. Brewster, Boston, MA (US); Timothy G. Healy, Boston, MA (US)

(73) Assignee: EnerNOC, Inc., Boston, MA (US)

( * ) Notice: Subject to any disclaimer, the term of this patent is extended or adjusted under 35 U.S.C. 154(b) by 401 days.

(21) Appl. No.: 10/314,920

(22) Filed: Dec. 9, 2002

(65) Prior Publication Data

US 2004/0111226 A1   Jun. 10, 2004

(51) Int. Cl.
*H02J 3/38* (2006.01)

(52) U.S. Cl. ............... 700/286; 700/295; 700/297

(58) Field of Classification Search ........... 700/286, 700/291, 295, 22, 297; 705/412; 702/61
See application file for complete search history.

(56) References Cited

U.S. PATENT DOCUMENTS

| | | | | |
|---|---|---|---|---|
| 6,157,874 A * | 12/2000 | Cooley et al. | ............... | 700/295 |
| 6,269,287 B1 * | 7/2001 | March | .................. | 700/286 |
| 6,522,955 B1 * | 2/2003 | Colborn | ............... | 700/286 |
| 6,625,520 B1 * | 9/2003 | Chen et al. | ............... | 700/286 |
| 6,633,823 B1 * | 10/2003 | Bartone et al. | ............ | 700/295 |
| 6,691,065 B1 * | 2/2004 | Hayashi et al. | ............ | 700/22 |
| 6,785,592 B1 * | 8/2004 | Smith et al. | ................ | 700/291 |
| 6,853,930 B1 * | 2/2005 | Hayashi et al. | ............ | 700/287 |
| 6,915,185 B1 * | 7/2005 | Yamamoto et al. | ......... | 700/286 |

FOREIGN PATENT DOCUMENTS

| | | |
|---|---|---|
| EP | 1263108 A1 | 12/2002 |
| WO | WO01/06612 A1 | 1/2001 |
| WO | WO01/61820 A1 | 8/2001 |
| WO | WO01/71881 A2 | 9/2001 |
| WO | WO01/98851 A1 | 12/2001 |
| WO | WO02/15365 A2 | 2/2002 |
| WO | WO03/056681 A1 | 7/2003 |

OTHER PUBLICATIONS

Sonderegger, Robert C., "Distributed Generation Architecture and Control", *E-Vision 2000 Conference*, 'Online 2000, pp. 292-301.

* cited by examiner

*Primary Examiner*—Leo Picard
*Assistant Examiner*—Charles Kasenge
(74) *Attorney, Agent, or Firm*—Bromberg & Sunstein LLP

(57) ABSTRACT

A method and system are associated with distributed generation of electric power. Power demand data of at least one electric power consumer is monitored over time. Power supply data of a regional power distribution system is also monitored over time. The power demand data and the power supply data are analyzed to coordinate control of at least one distributed generation system associated with the electric power consumer.

56 Claims, 4 Drawing Sheets

AGGREGATION OF DISTRIBUTED GENERATION RESOURCES

FIELD OF THE INVENTION

The invention generally relates to generation and distribution of electric power, and specifically, to aggregation of distributed generation resources.

BACKGROUND ART

Businesses and industry continue to require and consume increased amounts of electric power. One reflection of this trend is growing interest in self-generation of electric power, either to replace or to supplement that delivered by load-serving entities and utilities over the existing electric power distribution grid. The employment of small-scale power generation capability at a local commercial or industrial facility has become known as distributed generation (DG).

Most owners and operators of DG systems lack sophisticated controls and functional software to optimize the performance of their systems. This usually results in under-utilization of DG assets and unfavorable economics for DG projects. In addition, most end-users of electric power do not want to become experts in microgeneration. While the number of DG assets increases, much of these sit idle, and owners lack the capability to access wholesale power markets or sell this excess generation capacity back to the electric power distribution grid.

SUMMARY OF THE INVENTION

A representative embodiment of the present invention includes a method and system associated with distributed generation of electric power. Power demand data of at least one electric power consumer is monitored over time. Power supply data of a regional power distribution system is also monitored over time. The power demand data and the power supply data are analyzed to coordinate control of at least one distributed generation system associated with the electric power consumer.

In a further such embodiment, the power demand data includes thermal load data associated with the electric power consumer. The method may also include determining savings resulting from the coordinated control.

In a further embodiment, an optimal control threshold condition for the operation of a distributed generation system is determined. This may further include automatically commencing generation of electric power for the electric power consumer when the threshold condition occurs. It may also include providing an override capability to allow for a subsequent override command to prevent the distributed power generation system from automatically commencing generation of electric power for the electric power consumer when the threshold condition occurs.

The optimal control threshold may be based upon incremental operating time periods for the distributed generation system such as 15-minute or one-hour increments. The optimal control threshold condition may be determined periodically, such as weekly. The optimal control threshold condition may be based upon a peak load condition, or a power consumption cost rate.

Embodiments of the present invention also include coordinating sales of the electric power generated by one or more distributed generation systems to the regional power distribution system, and/or initiating a load curtailment process to reduce demand from the grid at strategic times, and/or determining cost-effective fuel purchase orders for one or more distributed generation systems based on the analysis of the power demand data and power supply data.

Embodiments of the present invention also include various user interfaces for monitoring one or more distributed generation system and/or demand data associated with one or more facilities. In one embodiment, the interface includes a power demand section for displaying power demand data associated with at least one electric power consumer, a power usage section for displaying power usage data associated with the electric power consumer including power usage data associated with at least one distributed generation system associated with the electric power consumer, and a power cost section for displaying power cost data associated with the power usage data.

In such an embodiment, the power demand data may include thermal load data associated with the electric power consumer. The power usage section may display power usage data according to an effective cost rate. The power cost section may display power cost data according to an effective cost rate. In addition, the data displayed may be periodically updated, such as at intervals of fifteen minutes or less. The power demand data, power usage data, and power cost data may include current data and historical data.

Another embodiment is a user interface for monitoring at least one distributed generation system. The interface includes a meter section for displaying parametric data associated with at least one distributed generation system, and an alarms section for displaying a visual warning indicative of an abnormal operating condition associated with the distributed generation system.

An embodiment also includes another user interface having a present control thresholds section for displaying present threshold data indicating existing threshold conditions at which at least one distributed generation system automatically commences generation of electrical power, and a historical thresholds section for displaying historical threshold data associated with the distributed generation system.

In such an embodiment, the present threshold data may be organized by cost rate and/or by time period. It may also include a savings section for displaying cost savings data associated with the distributed generation system.

DETAILED DESCRIPTION OF SPECIFIC EMBODIMENTS

Embodiments of the present invention are directed to energy service infrastructure focused on various aspects of distributed generation (DG) of electric power including monitoring, alarming, control, aggregation, billing, data management, and reporting. The objectives include generation control and building energy management and control systems that are optimized for peak shaving and demand response activities, and which facilitate automation of various load curtailment-related strategies at the end-use level. Multiple DG systems are networked in real-time within a single user interface for optimal control and verification. This creates an enabling technology system for facilitating customer or end-user participation in day-ahead or real-time markets for power, and optimized utilization of distributed generation equipment.

More specifically, embodiments enable end-use electric power consumers and networked third parties to optimally aggregate and control distributed generation (DG) capacity. An economic optimization engine formulates advanced control strategies for DG systems. In one embodiment, the optimization engine periodically determines various decision rules such as optimal control thresholds for minimizing demand charges (peak shaving) and optimal operating periods to access existing wholesale and other market opportunities. Extensive historical and real-time data resources are provided to the optimization engine, including, for example, building energy use, fuel costs, asset operation and maintenance costs, local and regional operating constraints (noise, other emission restrictions), weather data, existing service and rate contracts, and local distribution system conditions. The resulting system allows for management of required load and distributed generation equipment in response to facility conditions, electric system or grid conditions, retail market prices, and wholesale market prices.

Figure 1:
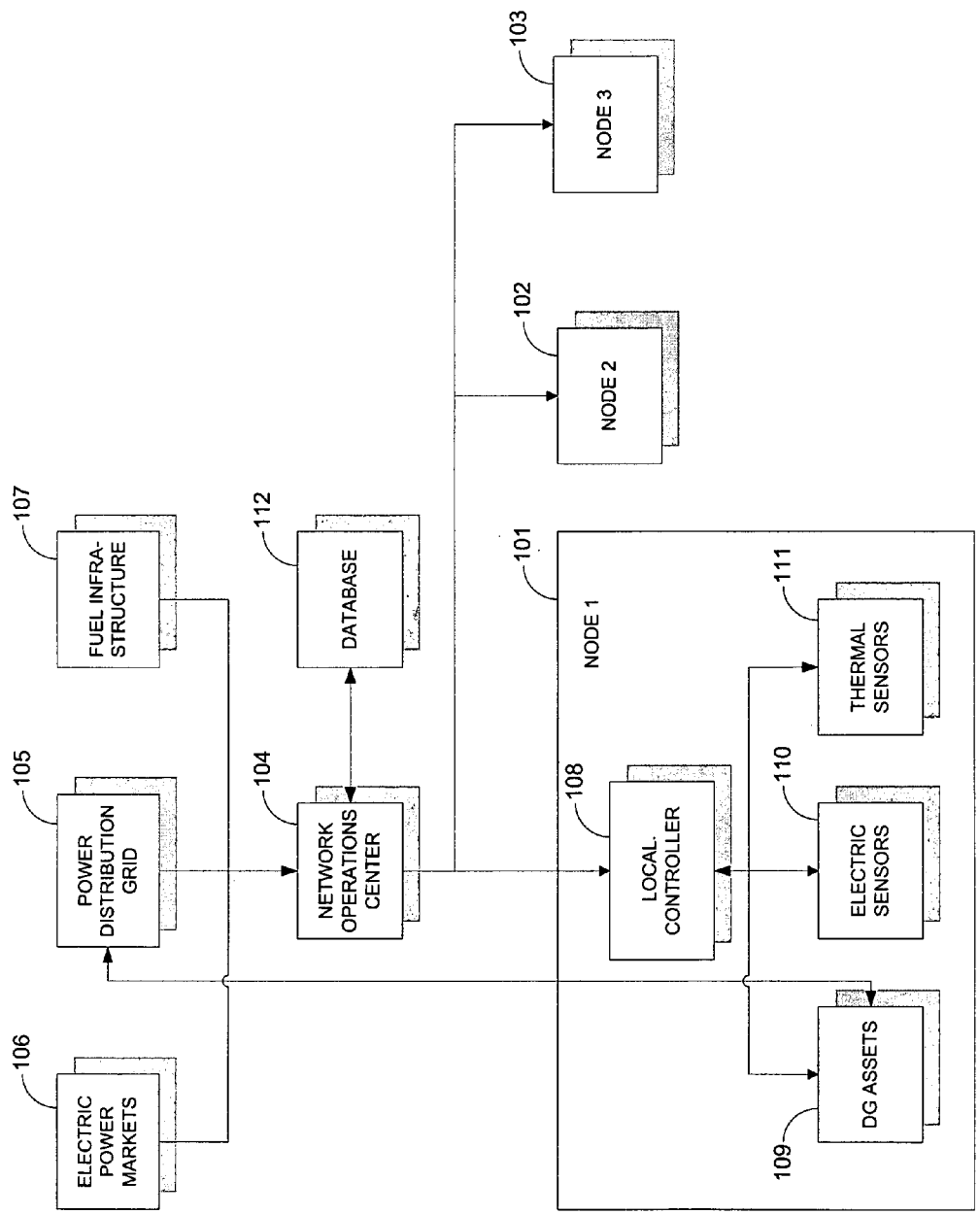
FIG. 1 is a functional block diagram of one specific embodiment of the present invention.

FIG. 1 shows a functional block diagram of one specific embodiment of the present invention. Multiple DG asset nodes 101–103 are in communication with and monitored by a network operations center (NOC) 104. The NOC 104 is also in communications with the actual electric power distribution grid 105, and the grid owners and operators (generally an Independent System Operator (ISO) or Regional Transmission Organization (RTO)) denoted as electric power markets 106, and a fuel infrastructure 107 that provides fuel for DG systems. Optimally, there might be one NOC 104 per major power market. The NOC 104 also maintains and utilizes a database 112 of information gathered from the various blocks it communicates with.

Within each DG node 101–103 is a microprocessor-controlled local controller 108 in communications with the NOC 104. The local controller 108 may include serial port, wireless, and/or Ethernet connection capability. For example, in one embodiment, the local controller 108 translates incoming communications in various protocols such as RS232, RS485, Modbus, LONWorks, etc. into a specified communications protocol such as Ethernet. In some embodiments, the local controller 108 uses wireless communications to communicate with the NOC 104 and other equipment within the DG node. In some embodiments, multiple communications channels are maintained to be available for communications between the NOC 104 and each node 101–103, and within each node. Such multiple channels facilitate more timely and effective responses than telephone-only approaches previously relied upon.

The local controller 108 controls and co-ordinates the operation of the DG assets 109 including transfer switches (which in some embodiments may be physically separate from the DG assets 109, and thus deserving of a separate block), various electric sensors 110 (meters) associated with the physical plant serviced by the DG system and the DG system itself, as well as various thermal sensors 111 associated with the physical plant serviced by the DG system. In other words, the local controller 108 determines whether and when to dispatch the DG assets 109 that it controls according to the various decision rules received and stored from the NOC 104. In some embodiments, the control of the DG assets 109 by the local controller 108 is complete and automatic, while in other embodiments, the process can be controlled by a human facility manager, who simply needs to respond to or ignore the recommended action of the local controller 108.

The electric sensors 110 and thermal sensors 111 may be, for example, commercially available "smart meters" to meter and monitor facility thermal and electrical loads, i.e., industrially-hardened devices that enable real-time, continuous, and accurate remote monitoring of electric and thermal characteristics of interest. To provide operating data to the local controller 108, older DG units may also require external "smart meters" similar to the meters used for facility loads, while newer DG units generally already have such data available at a communications port.

The facility and DG data generated by the sensors typically are sent in real-time to the local controller 108 where it is generally stored at the DG node for later transfer to the network operations center 104 and its database 112. This data includes distributed generation equipment operating information, and facility load data such as real-time and historical electric and thermal load data. Typically, the NOC 104 automatically uploads this data at regular intervals, for example, once a week, for storage in the centralized database 112. In addition, the sensor data may be uploaded responsive to a polling query from the NOC 104.

The NOC 104 together with the local controller 108 at each node 101–103 form a system of distributed intelligence that represents a shift from previous centralized or non-existent intelligence models designed for the management of distributed power generation systems at end-use customer facilities. Each local controller 108 possesses enough intelligence to process the information it receives in order to determine whether or not to dispatch the DG assets 109 that it controls based on the various decision rules it has received from the NOC 104. This distributed intelligence system also provides redundant data collection, information storage, and basic microprocessing capability.

The NOC 104 contains the core system software: the more rigorous and complicated optimization engine that formulates the decision rules that carry out the facility-specific and network control strategies. The NOC 104 uses the data gathered from the various other blocks in the network and stored in its database to determine threshold controls for turning on and off the DC assets 109 at the various nodes. A threshold command may be, for example, a simple on/off command, which tells a generator to operate to keep peak kilowatt (kW) demand from exceeding a pre-set value. Such threshold commands may be updated at various intervals and may control the DC assets 109 in blocks of time. For example, one specific embodiment sets hourly thresholds once per week, for the entire week, for each DG asset 109 in the network.

This threshold setting is inherently difficult. Among other things, conventional rate structures are based on both consumption charges and peak demand charges over a billing period, which makes calculation of instantaneous "next kWh" costs difficult. Specific embodiments use a NOC algorithm that utilizes the information in the database 112 (including facility load profiles, DG equipment operating characteristics, grid conditions, weather, utility rates, and other signals from within customers' facilities and from external sources) in a series of parametric calculations to determine exactly when to trigger DG operation for each period of the billing cycle (e.g., per quarter hour or hourly). The goal of such an algorithm is to minimize a facility's overall energy costs by identifying optimal tradeoffs between electricity and DG fuel prices. Artificial intelligence (genetic algorithms and fuzzy logic) can enable the NOC algorithm to get better at predicting facility loads, becoming "smarter" over time and continually increasing its usefulness.

Once the NOC 104 calculates the threshold controls for an upcoming period of time, such as the next week, these may be sent via a communications network, such as the Internet or wireless system to the local controllers 108 at each node. The threshold controls are stored in the local controllers 108 and automatically trigger DG operation based on readings from the site's electric and thermal meters 110 and 111. In some embodiments, the NOC 104 and/or the individual DG nodes 101–103 may have the ability to override these stored commands in real-time in response to grid (spot) prices, operating constraints, unpredicted facility loads, and other signals. Control of the DG assets 109 by the NOC 104 requires development of command and control software for each specific transfer switch and DG make/model. Such commands are communicated via public networks (e.g., the Internet) or wireless networks to the local controllers 108 at each node, and subsequently to the DG assets 109 via serial port connections (newer DG systems), dry-contact relay (older DG systems), or wireless communications systems. The NOC 104 also determines and communicates real-time commands to the DG nodes to take advantage of load curtailment and grid sellback opportunities.

Typically, the NOC 104 provides network oversight and management of DG assets 24 hours a day, seven days a week. The NOC 104 stores and retrieves data from customer sites and external sources in its database 112. Facility data and key DG parameters are communicated periodically, for example, every 15 minutes or less, while optimal control thresholds and other signals are broadcast over the network to multiple DG nodes.

Embodiments are adaptable to different DG technologies, facility characteristics, rate structures, and control strategies. The optimization engine is based on neural networks and genetic algorithms possessing artificial intelligence that continually learns more about a facility's consumption patterns, DG system performance, and market opportunities. Over time, the system evolves into greater efficiency and effectiveness at predicting facility loads. The resulting system is an enabling technology with a Web-based component that serves as an energy information tool to facilitate decision-making through real-time access to load data, baseline data, historical data, and market activity.

Moreover, while each individual DG node may be administered and controlled by the NOC 104 independently of other DG nodes, in other embodiments, the NOC 104 may coordinate the management of multiple DG nodes to obtain further benefits. For example, the production capacity and fuel sources of multiple nodes can be taken into account in determining optimal control thresholds, and excess DG capacity when a given DG asset is operating may be made available to other nodes, depending on specific circumstances including specifics of the relevant electric power distribution infrastructure.

Figure 2:
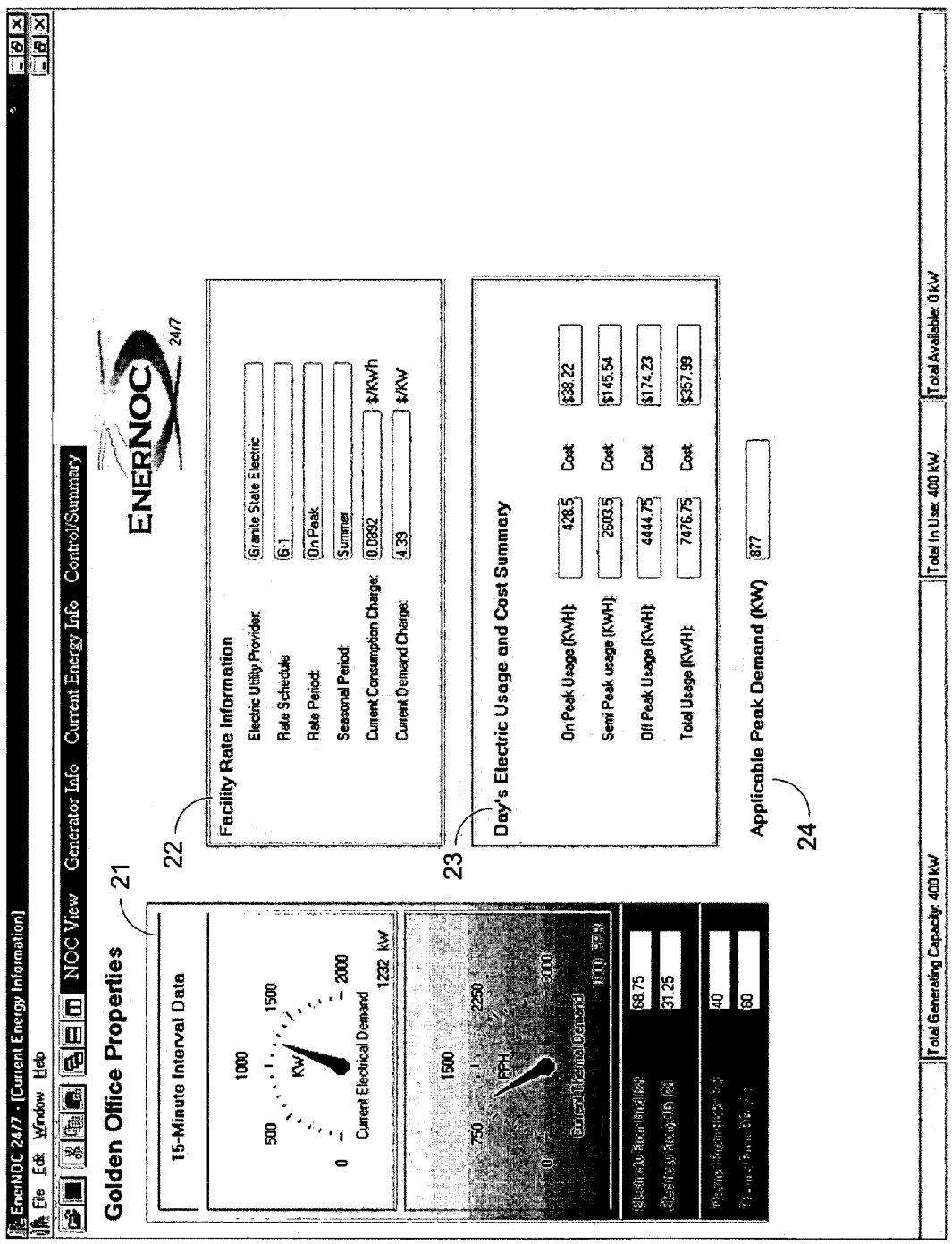
FIG. 2 is a screen shot of one embodiment showing a display of real-time and historical distributed generation system information.
Figure 3:
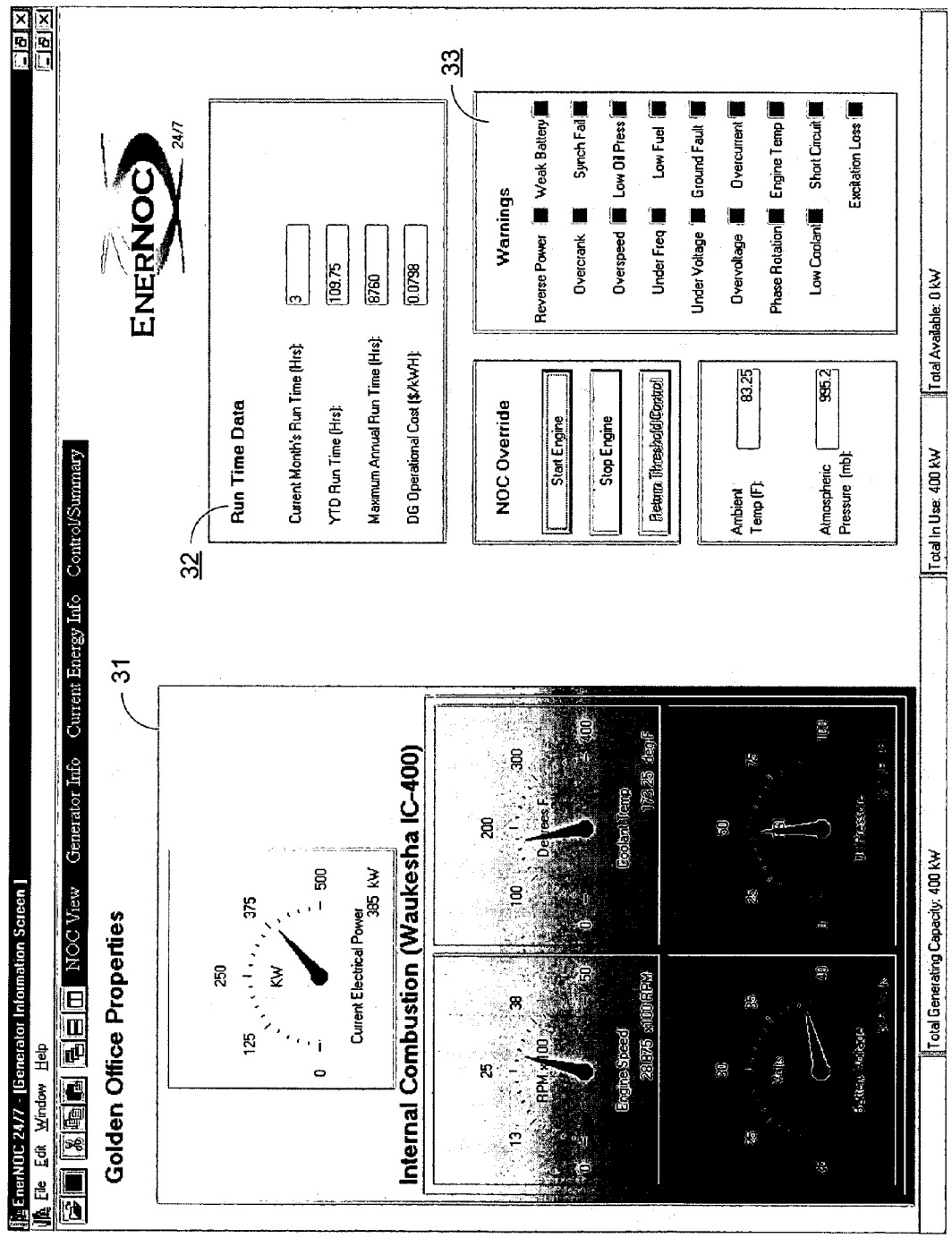
FIG. 3 is another screen shot of an embodiment showing a display of current and historical facility-specific energy consumption data.

The various data gathered by the NOC 104 from each local controller 108 may be usefully presented in one or more user interfaces, such as those shown in FIGS. 2 and 3. FIG. 2 allows monitoring of facility energy demand and consumption, including, for example, a 15-minute interval data section 21 that includes overall electric demand, overall thermal demand, percent electricity from the grid and from the DG assets, and percent useful heat from the site boiler and from the DG assets. A facility rate information section 22 identifies the specific electric utility provider, rate schedule, rate period, seasonal period, current consumption charge rate, and current demand charge rate. A day's usage and cost section 23 summarizes on-peak usage and cost, semi-peak usage and cost, off-peak usage and cost, and total usage and cost. Applicable peak demand 24 may also be displayed.

FIG. 3 shows an interface for continuously monitoring and recording interval data from each DG unit. A DG equipment meters section 31 provides displays of DG parameters such as battery voltage, oil pressure, engine speed, coolant temperature, and power output. This section or a similar one could also be used to display fuel level, ambient temperature, and atmospheric pressure. The process of configuring meters to read key operating parameters from older DG units requires customization and a slightly different approach for each DG make/model. Newer DG installations are capable of transmitting key operating parameters via serial port or Ethernet. A run-time data section 32 displays the current month's run-time, year-to-date run-time, maximum annual run-time, and DG operations cost rate. Out-of-tolerance alarms 33 can be displayed as a warning light indication for various DG failure modes and conditions, and these alarms can further be set to trigger pager and email alarms.

Figure 4:
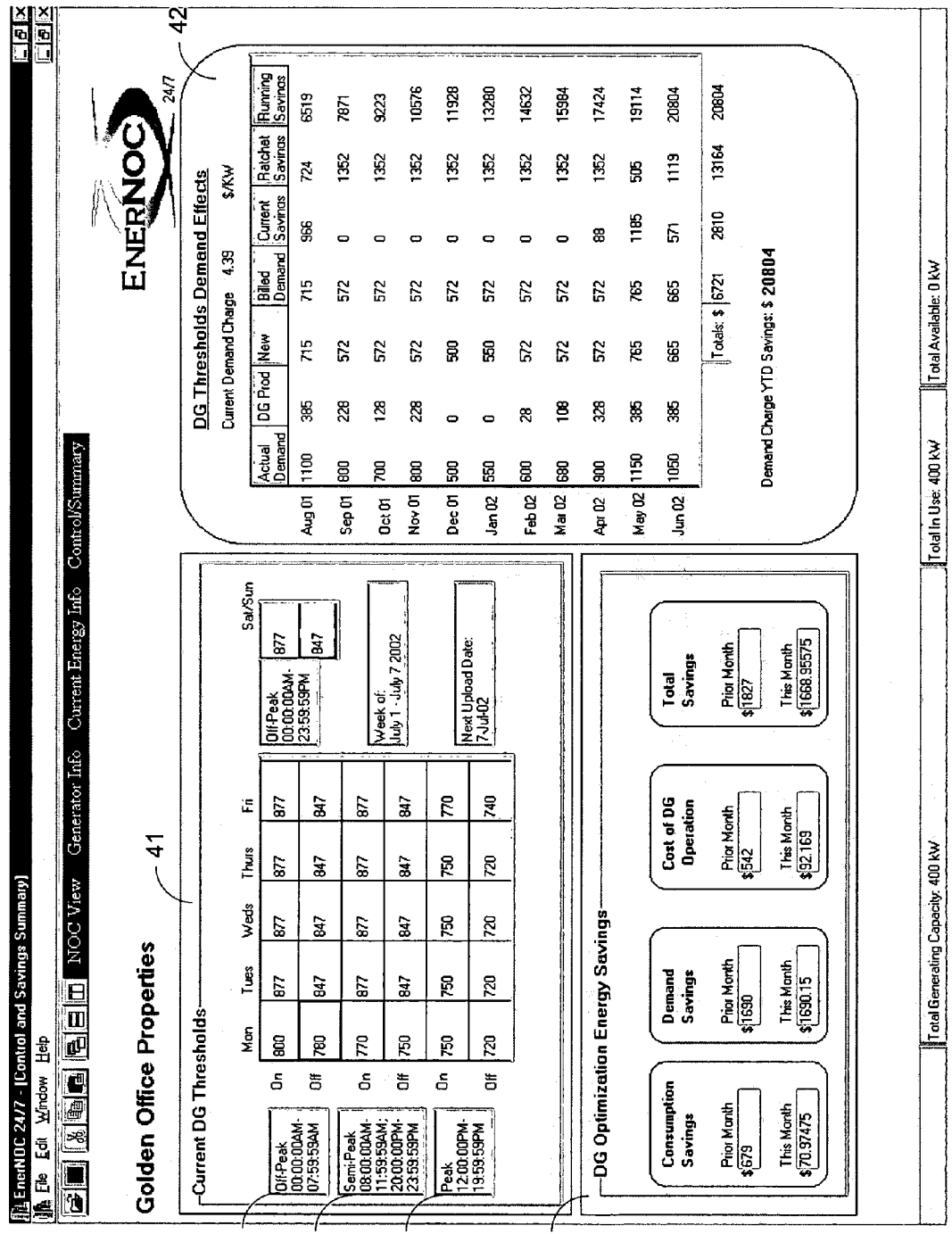
FIG. 4 is another screen shot of an embodiment showing a display of real-time and historical energy savings data.

FIG. 4 shows an example of one user interface report presented to show the current DG operating plan in combination with reporting of the effects of the DG optimization achieved by a specific embodiment of the invention. A current thresholds section 41 has an off-peak row 411, a semi-peak row 412, and a peak row 413. Each row corresponds to a different utility supply rate structure period, the exact times for which may also be displayed as shown in FIG. 4. For each rate row 411–413, the optimized on/off power demand thresholds are displayed as determined by the NOC 104. When power demand on a given day at the local DG node reaches the predetermined on-threshold, the local DG asset 109 at that node will commence operating and supplying power to the node in excess of the threshold, until power demand falls below the off-threshold, at which point the local DG asset 109 ceases operating.

The user interface report in FIG. 4 also has a thresholds demand effects section 42 that shows the accumulated effects of such optimized operation of DG assets 109 in terms of total power consumption, power supplied by the DG asset 109 vs. power consumed from the power distribution grid 105, and resulting savings. An optimization energy savings section 43 provides further detail regarding the current savings attributable to the optimized DG operation.

Other specific applications of the strategies developed by this system include peak load reduction, load curtailment programs, and grid sellback opportunities. For example, some organizations can reduce a significant component of their annual energy expenses by as much as 33% by reducing the top 100 hours of peak energy costs. Among the benefits conferred by such embodiments, are significant energy savings (typically greater than 12% of total energy costs) with coordinated use of DG resources. Important real-time information is available to enable DG equipment to respond quickly to market opportunities and to optimize the value of available energy assets. Reports are produced to inform customers about the savings resulting from such optimization strategies and to help improve system managers' understanding of their site's or sites' energy usage.

Other benefits include improved reliability of DG systems by regulating their operation, better return on investment including opportunities to capture new revenue streams, improved utility contracts based on aggregation of energy consumption and negotiation of bulk rates, and improved supply availability to power grids thereby improving system-wide reliability. It is not necessary that energy consumption behavior be changed, thereby offering a non-intrusive alternative to other demand or load management strategies. Outsourcing DG and other energy management services to networked third parties enables optimal generation management activities that can be almost undetectable to customers.

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared) or other transmission techniques. The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method associated with distributed generation of electric power, the method comprising:
   monitoring power demand data over time of at least one electric power consumer;
   monitoring power supply data over time of a regional power distribution system;
   analyzing the power demand data and power supply data to coordinate control of at least one distributed generation system associated with the electric power consumer;
   determining an optimal control threshold condition for the distributed generation system for automatically commencing generation of electric power for the electric power consumer when the threshold condition occurs; and
   providing an override capability to allow for a subsequent override command to prevent the distributed power generation system from automatically commencing generation of electric power for the electric power consumer when the threshold condition occurs.

2. A method according to claim 1, wherein the power demand data includes thermal load data associated with the electric power consumer.

3. A method according to claim 1, further comprising:
   determining savings resulting from the coordinated control.

4. A method according to claim 1, further comprising:
   automatically commencing generation of electric power for the electric power consumer when the threshold condition occurs.

5. A method according to claim 1, wherein the optimal control threshold condition is based upon a peak load condition.

6. A method according to claim 1, wherein the optimal control threshold condition is based upon at least one of power demand and power consumption cost rate.

7. A method according to claim 6, further comprising:
   selling the electric power generated by the distributed generation system to the regional power distribution system.

8. A method according to claim 1, further comprising:
   initiating a load curtailment process when the threshold condition occurs.

9. A method associated with distributed generation of electric power, the method comprising:
   monitoring power demand data over time of at least one electric power consumer;
   monitoring power supply data over time of a regional power distribution system;
   analyzing the power demand data and power supply data to coordinate control of at least one distributed generation system associated with the electric power consumer;
   determining an optimal control threshold condition for the distributed generation system for automatically commencing generation of electric power for the electric power consumer when the threshold condition occurs;
   wherein the optimal control threshold is based upon incremental operating time periods of the distributed generation system based on one hour increments.

10. A method according to claim 9, wherein the power demand data includes thermal load data associated with the electric power consumer.

11. A method according to claim 9, further comprising:
    determining savings resulting from the coordinated control.

12. A method according to claim 9, further comprising:
    automatically commencing generation of electric power for the electric power consumer when the threshold condition occurs.

13. A method according to claim 9, wherein the optimal control threshold condition is based upon a peak load condition.

14. A method according to claim 9, wherein the optimal control threshold condition is based upon at least one of power demand and power consumption cost rate.

15. A method according to claim 14, further comprising:
selling the electric power generated by the distributed generation system to the regional power distribution system.

16. A method according to claim 9, further comprising:
initiating a load curtailment process when the threshold condition occurs.

17. A method associated with distributed generation of electric power, the method comprising:
monitoring power demand data over time of at least one electric power consumer;
monitoring power supply data over time of a regional power distribution system;
analyzing the power demand data and power supply data to coordinate control of at least one distributed generation system associated with the electric power consumer;
determining on a weekly basis an optimal control threshold condition for the distributed generation system for automatically commencing generation of electric power for the electric power consumer when the threshold condition occurs.

18. A method according to claim 17, wherein the power demand data includes thermal load data associated with the electric power consumer.

19. A method according to claim 17, further comprising:
determining savings resulting from the coordinated control.

20. A method according to claim 17, further comprising:
automatically commencing generation of electric power for the electric power consumer when the threshold condition occurs.

21. A method according to claim 17, wherein the optimal control threshold condition is based upon a peak load condition.

22. A method according to claim 17, wherein the optimal control threshold condition is based upon at least one of power demand and power consumption cost rate.

23. A method according to claim 22, further comprising:
selling the electric power generated by the distributed generation system to the regional power distribution system.

24. A method according to claim 17, further comprising:
initiating a load curtailment process when the threshold condition occurs.

25. A method associated with distributed generation of electric power, the method comprising:
analyzing power demand data of at least one electric power consumer associated with at least one distributed generation system;
determining an optimal control threshold condition for the distributed generation system for automatically commencing generation of electric power for the electric power consumer when the threshold condition occurs; and
providing an override capability to allow for a subsequent override command to prevent the distributed power generation system from automatically commencing generation of electric power for the electric power consumer when the threshold condition occurs.

26. A method according to claim 25, wherein the power demand data includes thermal load data associated with the electric power consumer.

27. A method according to claim 25, further comprising:
determining savings resulting from generation of electric power for the electric power consumer when the threshold condition occurs.

28. A method according to claim 25, further comprising:
automatically commencing generation of electric power for the electric power consumer when the threshold condition occurs.

29. A method according to claim 25, wherein the optimal control threshold condition is based upon a peak load condition.

30. A method according to claim 25, wherein the optimal control threshold condition is based upon at least one of power demand and a power consumption cost rate.

31. A method according to claim 30, further comprising:
selling the electric power generated by the distributed generation system to the regional power distribution system.

32. A method according to claim 25, further comprising:
initiating a load curtailment process when the threshold condition occurs.

33. A method associated with distributed generation of electric power, the method comprising:
analyzing power demand data of at least one electric power consumer associated with at least one distributed generation system;
determining an optimal control threshold condition for the distributed generation system for automatically commencing generation of electric power for the electric power consumer when the threshold condition occurs;
wherein the optimal control threshold is based upon incremental operating time periods of the distributed generation system based upon one hour increments.

34. A method according to claim 33, wherein the power demand data includes thermal load data associated with the electric power consumer.

35. A method according to claim 33, further comprising:
determining savings resulting from generation of electric power for the electric power consumer when the threshold condition occurs.

36. A method according to claim 33, further comprising:
automatically commencing generation of electric power for the electric power consumer when the threshold condition occurs.

37. A method according to claim 33, wherein the optimal control threshold condition is based upon a peak load condition.

38. A method according to claim 33, wherein the optimal control threshold condition is based upon at least one of power demand and a power consumption cost rate.

39. A method according to claim 38, further comprising:
selling the electric power generated by the distributed generation system to the regional power distribution system.

40. A method according to claim 33, further comprising:
initiating a load curtailment process when the threshold condition occurs.

41. A method associated with distributed generation of electric power, the method comprising:
analyzing power demand data of at least one electric power consumer associated with at least one distributed generation system;
determining on a weekly basis an optimal control threshold condition for the distributed generation system for automatically commencing generation of electric power for the electric power consumer when the threshold condition occurs.

42. A method according to claim 41, wherein the power demand data includes thermal load data associated with the electric power consumer.

43. A method according to claim 41, further comprising: determining savings resulting from generation of electric power for the electric power consumer when the threshold condition occurs.

44. A method according to claim 41, further comprising: automatically commencing generation of electric power for the electric power consumer when the threshold condition occurs.

45. A method according to claim 41, wherein the optimal control threshold condition is based upon a peak load condition.

46. A method according to claim 41, wherein the optimal control threshold condition is based upon at least one of power demand and a power consumption cost rate.

47. A method according to claim 46, further comprising: selling the electric power generated by the distributed generation system to the regional power distribution system.

48. A method according to claim 41, further comprising: initiating a load curtailment process when the threshold condition occurs.

49. A method associated with distributed generation of electric power, the method comprising:

analyzing power demand data of at least one electric power consumer associated with at least one distributed generation system;

determining an optimal control threshold condition for the distributed generation system for automatically commencing generation of electric power for the electric power consumer when the threshold condition occurs; and determining a fuel purchase order for the distributed generation system based on the analysis of the power demand data and power supply data.

50. A method according to claim 49, wherein the power demand data includes thermal load data associated with the electric power consumer.

51. A method according to claim 49, further comprising: determining savings resulting from generation of electric power for the electric power consumer when the threshold condition occurs.

52. A method according to claim 49, further comprising: automatically commencing generation of electric power for the electric power consumer when the threshold condition occurs.

53. A method according to claim 49, wherein the optimal control threshold condition is based upon a peak load condition.

54. A method according to claim 49, wherein the optimal control threshold condition is based upon at least one of power demand and a power consumption cost rate.

55. A method according to claim 54, further comprising: selling the electric power generated by the distributed generation system to the regional power distribution system.

56. A method according to claim 49, further comprising: initiating a load curtailment process when the threshold condition occurs.

* * * * *